C. F. HOFFMAN.
ASH SIFTING SHOVEL.
APPLICATION FILED NOV. 15, 1910.
1,007,566.
Patented Oct. 31, 1911.
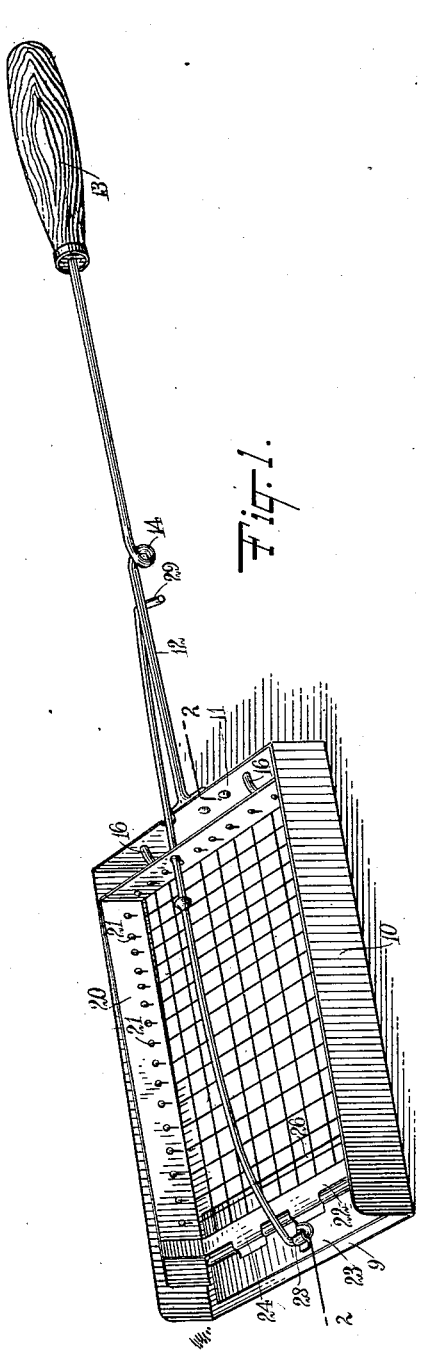
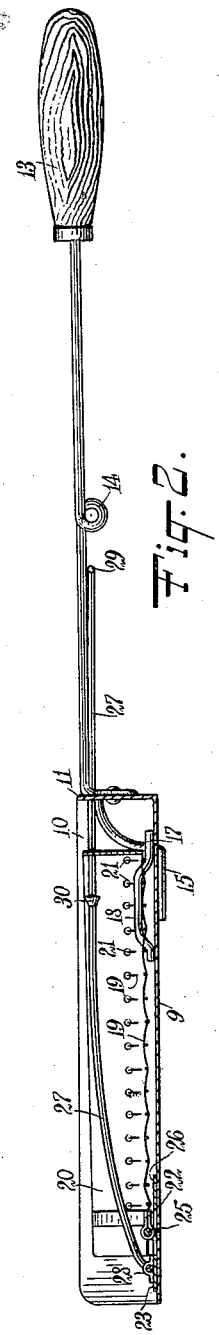
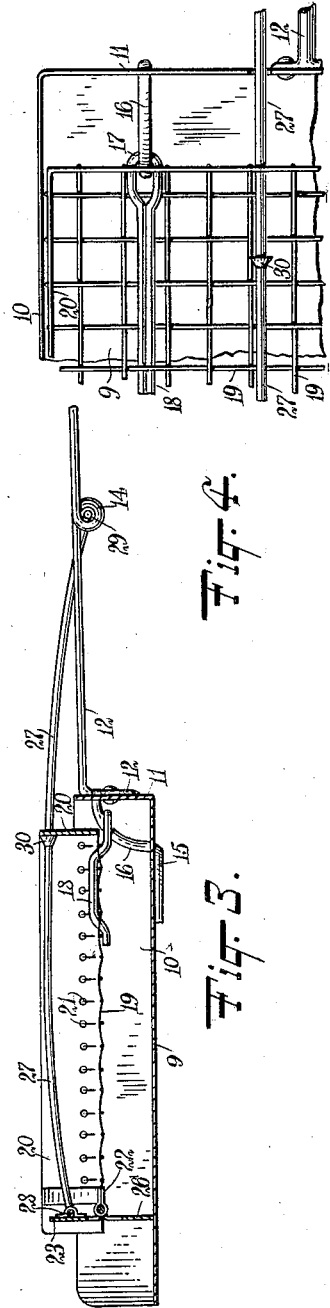
WITNESSES
George Bambay.
INVENTOR
Charles F. Hoffman
BY Munn & Co.
ATTORNEYS

UNITED STATES PATENT OFFICE.

CHARLES F. HOFFMAN, OF LANSING, MICHIGAN, ASSIGNOR OF ONE-HALF TO EVERETT E. STINCHCOMB, OF MARSHALL, MICHIGAN.

ASH-SIFTING SHOVEL.

1,007,566.  Specification of Letters Patent.  Patented Oct. 31, 1911.

Application filed November 15, 1910. Serial No. 592,546.

*To all whom it may concern:*

Be it known that I, CHARLES F. HOFFMAN, a citizen of the United States, and a resident of Lansing, in the county of Ingham and State of Michigan, have invented a new and Improved Ash-Sifting Shovel, of which the following is a full, clear, and exact description.

Among the principal objects which the present invention has in view are: to provide an apparatus of the character set forth wherein the ash and partly burned coal are separated in the shovel; to provide means for lifting the sifting device above the bottom of the shovel during the operation of sifting; and to provide an apparatus of the character mentioned which is simple, economical and durable.

One embodiment of the present invention is disclosed in the structure illustrated in the accompanying drawings, in which like characters of reference denote corresponding parts in all the views, and in which—

Figure 1 is a perspective view of a shovel constructed and arranged in accordance with the present invention; Fig. 2 is a longitudinal vertical section of the same, the section being taken on the line 2—2 in Fig. 1; Fig. 3 is a similar view, showing the shovel in raised or operative position; and Fig. 4 is an enlarged detail view in plan, showing a fragment of the shovel and means for guiding the same to its raised or sifting position.

The body 9 of the shovel may be constructed in any approved manner. The form preferred by me is that having vertically raised sides 10, 10 and a vertically raised back 11. To the back 11 of the body 9 is rigidly secured a handle bar 12. The handle bar 12 is, at the outer end thereof, provided with a suitable hand grip 13. Midway between the body 9 and the grip 13 the handle bar 12 is bent upon itself to form an eyelet 14, or is provided with a lug to answer same purpose.

The body 9 is reinforced by means of two skids 15, 15 which are clamped rigidly to the bottom of the body 9 to form sliding portions therefor. The skids are unbent to form curved lifted sections 16, 16, which sections are passed through the bottom of the body 9 and through the back 11, and are headed or riveted in rigid connection with the said back. The brace formed of the sections 16 of the skids 15 thus constructed produces a reinforcement to the construction of the back end of the shovel. The primary object in forming the curved sections 16, 16 is to form supporting guides for the rear of the sifter, the eyelets 17, 17 infolding the sections 16, 16 in sliding relation therewith. The eyelets 17, 17 are formed at the outer end of small bar sections 18, 18. The bar sections 18, 18 are bent as shown best in Figs. 2 and 3 of the drawings, and passed between wires 19 forming the bottom of the sifter. It will be noted that as the sifter is drawn backward it is moved to the operative position, the eyelets 17, 17 running over the curved sections 16, 16, lifting the rear of the sifter to the position shown in Fig. 3 of the drawings.

The sifter is a three sided box structure, the sides 20, 20 of which are vertically disposed and punched to form eyelets 21, 21 for the reception of the overturned ends of the wires 19, when the same is woven, as shown in the drawings, and upturned and passed through the said eyelets. By turning the ends thus protruding through the eyelets down, the bottom or wire portion of the sifter is firmly secured in the structure. The forward edge of the sifter is open as shown in Fig. 3 of the drawings. A cross bar 22 is hingedly connected to a plate 23, the hinges being formed by the overturned loops 24 and a wire 25 extended across the front end of the sifter. The plate 23 is extended to both sides of the hinge to form the outer extension, and an inner extension 26.

In the position of the parts as shown in Fig. 2 of the drawings, which is the position of the parts when being used as a shovel, the plate 23 is disposed in resting relation upon the bottom of the body 9. The mixed ashes and coal are forced into the body of the shovel between the sides 20, 20 of the sifter to rest on the bottom of the body 9. It is to raise the sifter to the position shown in Fig. 3 of the drawings that I have provided the extension 26 of the plate 23, and also the bar 27. The bar 27 is pivotally connected at 28 with the plate 23. The said bar is provided at the opposite end with a hook 29 adapted to fit within the eyelet 14, where the same is formed in the handle 12, as above described. Normally, and in the position shown in Figs. 1 and 2, the bar 27 rests as shown in the said figures. When, however, it is desired to raise the sifter to the position shown in Fig. 3, the bar 27 is pulled backward toward the grip 13 until the stop 30 strikes upon the back of the sifter to arrest the bar in such position. In this position it will be noted that the hook 29 at the end of the bar 27 is alined with the eyelet 14 or lug, and may be extended therethrough or back thereof. In this position of the bar 27, it will be seen that the sifter is held in the position shown in Fig. 3 of the drawings, having been raised by the double action of the lift of the plate 23 in pivoting on the hinge bar 25 and the slide of the eyelets 17, 17 over the curved sections of the skids 15. In the position thus imposed upon the parts of the apparatus the coal contained in the load picked up by the shovel may be separated from the fine ash by the usual method of shaking. When the ash is thus separated it will be found to be deposited in the body portion of the shovel. By depressing the bar 27, the hook 29 being removed from the eyelet 14 to permit such movement, the sifter is lifted to raise the plate 23 and the extension 26 thereof from the bottom of the body portion 9. In this position the shovel or body portion 9 may be emptied of the fine or waste ash, while the sifter retains the coal or cinder. The ash having been thus disposed of, the sifter is returned to the position as shown in Fig. 1, allowing the contents to be disposed of as from an ordinary shovel.

Having thus described my invention, what I claim as new and desire to secure by Letters Patent is:—

1. An ash sifting shovel, comprising a body portion having an open ended box-like form; a sifter having vertical longitudinal sides and back; a front closure member pivotally mounted upon said sifter at the forward edge thereof, said member having extensions on both sides of the pivotal mounting thereof to form a support for the forward edge of said sifter when said member is elevated to close the forward end of said sifter; and guide supports for said sifter slidably connected with the same at the rear thereof, arranged to elevate the said sifter as the same is drawn toward the back of said body portion.

2. An ash sifting shovel, comprising a body portion having an open ended box-like form; a plurality of inclined brace members disposed between the back and bottom of said body portion; a sifter having rigid vertically disposed back and sides and a sieve-like bottom, said sifter being slidably connected with said inclined brace members; a front closure member pivotally mounted on said sifter, said closure member having a supporting extension adapted to rest below said sifter when the closure member is vertically disposed to close the end of said sifter; an operating rod pivotally connected with said closure member; and means for connecting said rod to the shovel structure when the said closure member is vertically disposed.

3. An ash sifting shovel, comprising a body portion having an open ended box-like form; a plurality of inclined brace members disposed between the back and bottom of said body portion; sliding members rigidly mounted upon said body portion and below the bottom thereof; a sifter having rigid vertically disposed back and sides and a sieve-like bottom, said sifter being slidably connected with said inclined brace members; a front closure member; an operating rod pivotally connected with said closure member and adapted to elevate the same to a vertical position; means mounted on said rod for impinging upon the structure of said sifter when the said closure member is disposed in vertical position; and an eyelet or lug mounted on the handle of said shovel to engage said rod when the same is drawn backward to elevate the said closure member.

4. An ash sifting shovel, comprising a body portion having an open ended box-like form; a sifter having vertical longitudinal sides and back; a front closure member pivotally mounted upon said sifter at the forward edge thereof, said member having extensions on both sides of the pivotal mounting thereof to form a support for the forward edge of said sifter when said member is elevated to close the forward end of said sifter; and means movably connecting said sifter substantially at its rear end to said body portion.

5. An ash sifting shovel, comprising a body portion having an open ended box-like form; a sifter having vertical longitudinal sides and back; a front closure member pivotally mounted upon said sifter at the forward edge thereof, said member having extensions on both sides of the pivotal mounting thereof to form a support for the forward edge of said sifter when said member is elevated to close the forward end of said sifter; means movably connecting said sifter substantially at its rear end to said body portion; and operating means connected to the upper portion of said closure member.

In testimony whereof I have signed this specification in the presence of two subscribing witnesses.

CHARLES F. HOFFMAN.

Witnesses:
JULIA M. BALDWIN,
JOSEPH H. DUNNEBACKE.

Copies of this patent may be obtained for five cents each, by addressing the "Commissioner of Patents, Washington, D. C."